Patented Nov. 13, 1928.

1,691,771

UNITED STATES PATENT OFFICE.

BORIS N. LOUGOVOY, OF MONTCLAIR, NEW JERSEY, ASSIGNOR TO CHADELOID CHEMICAL COMPANY, A CORPORATION OF WEST VIRGINIA.

PAINT AND VARNISH REMOVER CONTAINING AN ALKALI METAL BENZOATE AS A THICKENING AGENT.

No Drawing.   Application filed February 25, 1926.   Serial No. 90,618.

This invention relates to a composition of matter, useful as a paint and varnish remover containing organic acid salts, especially the alkali metal salts of the benzoate type, e. g., sodium benzoate.

The solvent vehicle of the remover is preferably composed of an alcohol such as denatured alcohol, wood alcohol, and the like, acetone, methyl ethyl ketone and similar ketones, and/or various other solvents of the type generally known in the paint removing art as wax precipitants.

The composition also may contain in addition to the above materials, a hydrocarbon such as benzol or toluol, and, in some cases, a wax such as ceresin or paraffin may be present.

A removing composition which contains neither wax nor benzol is made by mixing ten parts by volume of acetone with eight parts of a saturated solution of sodium benzoate in denatured alcohol. The latter solution may be made, for example, by warming the alcohol with an excess of sodium benzoate, cooling and drawing off the saturated solution. Depending upon the quality of the denatured alcohol and the amount of water present in it, the amount of sodium benzoate thus dissolved may range from eight per cent and upwards.

On mixing the two solutions precipitation of the benzoate occurs, the material separating in a highly flocculent condition, giving the composition a thickish consistency.

Such a composition has the disadvantage of undue evaporation for many purposes, e. g., for application on very thick coats of paints and varnish, or on coatings which are exposed to the sun, and so forth. The addition of a comparatively small amount of wax such as paraffin or ceresin wax overcomes this difficulty. Only about one per cent of wax is necessary.

A composition of this character may be made by dissolving about thirty grams of paraffin wax in a liter of warm acetone and incorporating with a liter of the saturated solution of sodium benzoate in alcohol.

A third composition is made by mixing thirty-five parts of acetone thirty parts of benzol and thirty parts of a saturated alcoholic solution of sodium benzoate.

A fourth composition is made by mixing four hundred and fifty parts of acetone, one hundred and forty parts of the alcoholic solution of sodium benzoate and four hundred parts of benzol, the latter containing about ten parts of ceresin wax.

The last mentioned formula has a desirable semi-liquid consistency.

It should be noted that in preparing the composition of the present invention that I prefer not to introduce any water (and at any event I do not add excessive quantities of water) and I preferably therefore do not dissolve the sodium benzoate in water, but in denatured alcohol, which usually is of about ninety-five per cent strength. Preferably the benzol and acetone are as free from water as is possible in commercial products. In any event, in carrying out the invention in the preferred manner, I avoid any addition of water as such, and this precludes the dilution of the solvents to the extent such that their cutting or softening action is reduced. In other words, I aim to maintain the solvents in as high a stage of concentration as is feasible when employing commercial materials.

Preferably I avoid the employment of chlorinated solvents such as carbontetrachloride and the like, which in contact with sodium benzoate are liable to decompose and reduce the percentage of the latter.

It is an object to maintain a stable composition which on long standing does not undergo alterations due to decomposition of the sodium benzoate by such unstable chlorinated solvents. It will be noted therefore that the foregoing formulas do not include solvents of this character.

It should be noted that sodium benzoate although soluble in denatured alcohol, as aforesaid, is relatively slightly soluble in acetone, hence on the addition of acetone to the alcoholic solution the desired degree of flocculation is readily produced without the addition of any other constituent.

While I have referred particularly to sodium benzoate, which I find most effective, I may use potassium benzoate, or mixtures of sodium and potassium benzoate, or other salts of the benzoate type effective for the purpose as a flocculating agent, especially in the substantial absence of water.

What I claim is:—

1. A paint and varnish remover comprising alcohol, acetone and sodium benzoate, the latter being partly in a precipitated condition, and said remover being substantially free from substances affecting the stability of the benzoate, and the benzoate being present in amount sufficient to give a substantial thickening effect.

2. A composition comprising alcohol, a ketone, and an alkali-metal benzoate, the latter being partly in a precipitated condition, and said remover being substantially free from substances affecting the benzoate, and the benzoate being present in amount sufficient to give a substantial thickening effect.

3. A composition comprising alcohol, acetone, in amount more than the amount of alcohol, and sodium benzoate, the latter being partly in a precipitated condition, and said remover being substantially free from substances affecting the benzoate, and the benzoate being present in amount sufficient to give a substantial thickening effect.

4. A paint and varnish remover comprising alcohol, a volatile ketone, benzol, wax and sodium benzoate, and being substantially free from substances affecting the stability of the benzoate, and the benzoate being present in amount sufficient to give a substantial thickening effect.

5. A composition adapted for use as a paint and varnish remover comprising flocculated sodium benzoate suspended in a mixture of volatile organic solvents for paint and varnish coatings, and being substantially free from chlorinated hydrocarbons tending to decompose said sodium benzoate on standing, and the benzoate being present in amount sufficient to give a substantial thickening effect.

6. A paint and varnish remover composition comprising denatured alcohol, acetone, benzol, wax, and a benzoate, the latter being partly in a precipitated condition, and said remover being free from chlorinated hydrocarbons, and the benzoate being present in amount sufficient to give a substantial thickening effect.

BORIS N. LOUGOVOY.